United States Patent [19]

Kaun

[11] 4,158,720
[45] Jun. 19, 1979

[54] LITHIUM-ALUMINUM-IRON ELECTRODE COMPOSITION

[75] Inventor: Thomas D. Kaun, Mokena, Ill.

[73] Assignee: The United States of America as represented by the United States Department of Energy, Washington, D.C.

[21] Appl. No.: 865,164

[22] Filed: Dec. 28, 1977

[51] Int. Cl.$^2$ .......................... H01B 1/02; B22F 1/04
[52] U.S. Cl. .................................. 428/567; 252/182.1; 204/293; 204/24; 429/221; 75/124; 75/138; 75/213; 252/513
[58] Field of Search ............................ 252/513, 182.1; 429/221; 75/124, 138, 213; 204/293, 24; 428/567

[56] References Cited

U.S. PATENT DOCUMENTS

| 3,607,413 | 9/1971 | Buzzelli ................................ 204/39 |
| 3,957,532 | 5/1976 | Settle et al. .................... 75/134 A X |
| 4,011,372 | 3/1977 | Tomczuk et al. ..................... 429/218 |

Primary Examiner—Richard E. Schafer
Assistant Examiner—E. Suzanne Parr
Attorney, Agent, or Firm—Dean E. Carlson; Frank H. Jackson; Hugh W. Glenn

[57] ABSTRACT

A negative electrode composition is presented for use in a secondary electrochemical cell. The cell also includes an electrolyte with lithium ions such as a molten salt of alkali metal halides or alkaline earth metal halides that can be used in high-temperature cells. The cell's positive electrode contains a a chalcogen or a metal chalcogenide as the active electrode material. The negative electrode composition includes up to 50 atom percent lithium as the active electrode constituent in an alloy of aluminum-iron. Various binary and ternary intermetallic phases of lithium, aluminum and iron are formed. The lithium within the intermetallic phase of $Al_5Fe_2$ exhibits increased activity over that of lithium within a lithium-aluminum alloy to provide an increased cell potential of up to about 0.25 volt.

10 Claims, 2 Drawing Figures

LITHIUM-ALUMINUM-IRON ELECTRODE COMPOSITION

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to electrodes for use in secondary electrochemical cells. More particularly, it concerns a negative electrode composition including lithium which exhibits an increased activity in electrode potential over that of the lithium-aluminum electrode.

A substantial amount of work has been done in the development of high-temperature, secondary electrochemical cells. Positive electrodes for these cells have included chalcogens such as sulfur, oxygen, selenium or tellurium as well as their transition metal chalcogenides. Positive electrode materials such as the sulfides of iron, cobalt, nickel and copper are of current interest.

In high-temperature cells, current flow between electrodes often is transmitted by molten electrolytic salt. Particularly useful salts include compositions of the alkali metal halides and/or the alkaline earth metal halides ordinarily incorporating a salt of the negative electrode reactant metal, e.g. lithium. In cells operating at moderate temperatures, aqueous and organic base electrolytes are permissible and these also can include cations of the negative electrode metal.

Alkali metals such as lithium, sodium, potassium, or alkaline earth metals including calcium, magnesium, etc. and alloys of these materials are contemplated as negative electrode reactants. Alloys of these materials such as lithium-aluminum, lithium-silicon, lithium-magnesium, calcium-magnesium, calcium-aluminum, calcium-silicon and magnesium-aluminum have been investigated to maintain the negative electrode in solid form and thereby improve retention of the active material at high cell operating temperatures.

One of the disadvantages of previous lithium alloys, e.g. lithium-aluminum electrodes, has been the reduced cell voltage as compared to negative electrodes containing molten lithium. The reduced cell voltage and power has been accepted in order to obtain the enhanced electrode and cell stability afforded by solid lithium alloys. However, even in lithium-aluminum negative electrodes, postoperative examinations of long-lived cells have revealed high lithium concentrations at the negative electrode face. In addition, current collector and cell structural components of iron are corroded by reaction with aluminum within the negative electrode. The present inventor has found that the addition of sufficient iron into the aluminum prior to alloying with lithium will increase the electrode voltage, power and energy density (energy/electrode weight), improve lithium retention and may reduce corrosion of iron components.

PRIOR ART STATEMENT

The following patents are related to the subject matter but do not teach or suggest the present invention:

Tomczuk et al., U.S. Pat. No. 4,011,372, Mar. 8, 1977, "Method of Preparing a Negative Electrode Including Lithium Alloy for Use within a Secondary Electrochemical Cell". This patent discloses a particular method of electrode preparation and suggests the use of lithium-aluminum, lithium-magnesium and lithium-silicon alloys. The reference, however, does not disclose or teach the use of lithium-aluminum-iron compositions with sufficient iron to provide increased lithium activity.

Settle et al., U.S. Pat. No. 3,957,532, May 18, 1976, "Method of Preparing an Electrode Material of Lithium-Aluminum Alloy". This patent discloses the various phases and compositions of lithium-aluminum alloys that are appropriate for use as a negative electrode material. However, no disclosure is made to suggest the addition of certain amounts of iron to lithium-aluminum alloys to increase negative electrode voltage.

Buzzelli, U.S. Pat. No. 3,607,413, Sept. 21, 1971, "Method for Electrochemical Alloying of Aluminum and Lithium". Negative electrodes of lithium-aluminum alloys are disclosed with the suggestion that they may contain less than 10 weight percent impurities of, for example, copper, magnesium, manganese, indium and iron. No suggestion is made in this patent of a lithium-aluminum-iron alloy as a negative electrode material with a sufficient amount of iron included to effect increased electrode activity.

SUMMARY OF THE INVENTION

It is an object of the present invention to provide a lithium-aluminum-iron alloy for use in a negative electrode within a secondary electrochemical cell.

It is a further object to provide a lithium-aluminum-iron alloy for use in a negative electrode which exhibits increased electrode potential over that of electrodes containing only lithium-aluminum alloys.

It is another object to provide a negative electrode material of an alloy containing both lithium and aluminum with reduced propensity for corrosion of iron cell components.

It is a further object to provide a lithium alloy, negative electrode material which tends to uniformly recharge with lithium without the production of high lithium concentrations at the negative electrode face.

In accordance with the present invention, a negative electrode composition for use in a secondary, high-temperature electrochemical cell is presented. The cell includes an electrolyte containing lithium ions and a positive electrode including chalcogens or transition metal chalcogenides. The negative electrode composition comprises about 5 to 50 atom percent lithium and about 95 to 50 atom percent alloy of aluminum and iron. The aluminum and iron alloy includes about 20 to 35 atom percent iron.

In a more specific aspect of the invention, the aluminum-iron alloy includes the intermetallic compound $Fe_2Al_5$. This compound, when saturated with lithium, provides an increased lithium activity and consequently increased electrode voltage over that of a comparable lithium-aluminum alloy. Therefore it is preferred that the uncharged or discharged electrode composition include $Fe_2Al_5$ in major proportion within the electrode composition. The lithium-iron alloy is preferably provided in ratios of about 1 atom part iron to about 2 to 3 atom parts aluminum so as to form a major proportion of the intermetallic compound $Fe_2Al_5$. Minor amounts of the intermetallic compounds $FeAl_2$ or $FeAl_3$ may appear within the composition depending on the exact ratio of aluminum to iron.

Although some $Fe_2Al_5$ is expected to be present in aluminum-iron alloys of 20 to 35 atom percent iron, this preferred intermetallic compound predominates within the compositional ranges of 25 to 33 atom percent iron and 67 to 75 atom percent aluminum. It should be in greatest proportion at its stoichiometric ratio of 71 atom percent aluminum and 29 atom percent iron, that is, about 70 atom percent aluminum and about 30 atom percent iron. This stoichiometric proportion of aluminum and iron, i.e. 5:2, in this intermetallic compound is therefore the most specific, preferred compositional relationship for the electrode material of this invention.

The electrode material can, in the fully charged state, include as much lithium as practical to permit the electrode material to remain in the solid state at the cell operating temperatures. Lithium concentrations of between 5 and 50 atom percent throughout the electrochemical cycle are contemplated. Small amounts of liquid alloy will not necessarily interfere with the cell operation, but may be retained within and on the surfaces of the residual solid substrate.

The present invention also comprehends a method of preparing an improved electrode material for use in secondary, high-temperature electrochemical cells. The electrode material is prepared by first providing an alloy of aluminum and iron and then depositing lithium metal into a porous mass containing that alloy. In one manner of preparing the electrode composition, iron and aluminum in the specified proportions are heated to a temperature between the melting temperature of aluminum and the melting temperature of iron. The resulting melt is solidified and comminuted to particles of aluminum-iron alloy. The particles of this alloy are integrated into a porous electrically conductive structure and lithium is electrodeposited into the aluminum-iron alloy.

DETAILED DESCRIPTION OF THE PREFERRED EMBODIMENT

Figure 1:
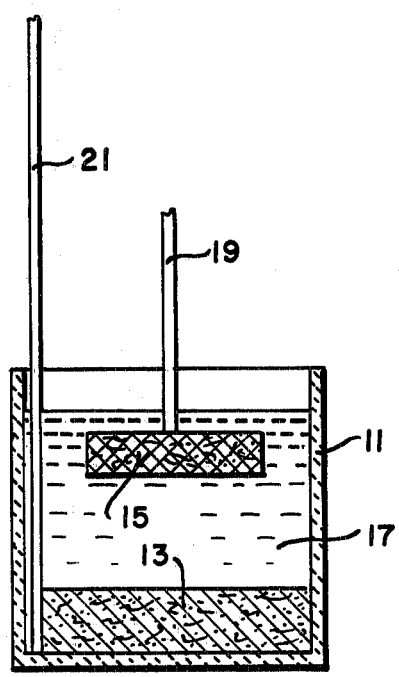
FIG. 1 is a schematic illustration of an electrochemical cell that can be used in testing the electrode composition of the present invention.

The improved electrode composition of the present invention includes lithium and aluminum along with sufficient quantities of iron to impart increased aluminum activity and increased electrode voltage over that of conventional lithium-aluminum alloys.

Sufficient iron is included in the original aluminum-iron alloy to produce substantial amounts of the intermetallic compound $Fe_2Al_5$. Compositions of aluminum and iron containing between 20 and 35 atom percent iron are expected to include this compound. However, it is preferred that the iron to aluminum proportions be such as to provide an alloy composition between the compounds of $FeAl_2$ and $FeAl_3$. That is, the preferred iron to aluminum atom proportions are between 1 part iron to 2 parts aluminum and 1 part iron to 3 parts aluminum. This corresponds to 25 to 33 atom percent iron and 67 to 75 atom percent aluminum. Within this range the intermetallic compound $Fe_2Al_5$ is most likely to appear in major amounts relative to the other iron-aluminum forms.

Lithium in amounts of about 5 to 50 atom percent is added by direct contact or by electrodeposition into the alloy of iron and aluminum. The lithium concentration is limited by its propensity to form molten phases with the alloy components at high temperatures and high lithium concentrations. Fifty atom percent lithium is selected as a practical limit for cells operating in the 350° C. to 550° C. temperature range suitable for molten electrolytes. Higher lithium concentrations may be selected for cells capable of operating at lower temperatures such as with molten salt eutectics having low melting points or with aqueous or organic base electrolytes containing lithium ions.

The use of alloys of aluminum-iron containing substantially less than 20 atom percent iron are expected to diminish the increased lithium activity attributable to the $Fe_2Al_5$ intermetallic compound. Such alloy compositions include $FeAl_3$ and aluminum or a liquid phase depending on the temperature. Little $Fe_2Al_5$ is expected to form. Alloys having greater than 35 atom percent iron are expected to include substantial amounts of $FeAl_2$, little $Fe_2Al_5$ and may exhibit an impaired ability to take up and cycle lithium within the operation of the electrochemical cell.

The improved negative electrode material can be prepared by various metallurgical techniques. One preferred manner of preparing the electrode material is to first form a molten alloy of iron and aluminum. The melt is formed at a temperature above the melting point of aluminum but below the melting point of iron. For the alloys contemplated herein temperatures of about 1200° C. or above are satisfactory. The melt is solidified and comminuted to particles of aluminum-iron alloy in the specified proportions. The particles of alloy are integrated into a porous electrically conductive structure. This can be achieved by compacting the particles together with electrolyte, by vibrating or otherwise distributing the particles into a porous electrically conductive substrate or by bonding the particles with a carbonaceous, thermosetting material to form a porous electrically conductive substrate.

Other metallurgical techniques can also be employed to provide an alloy composition of aluminum and iron. The materials may be melted together and cast or extruded into wire form. Extruded wires or elongated particles of the iron-aluminum alloy can be entangled into a porous mass and compacted. Also, a mass of wires or particles can be sintered to integrate them into a porous substrate in the desired constituent proportions. In one other method, foam metals of the preferred aluminum-iron composition can be provided using conventional techniques such as by agitating a molten alloy into a foam by quick solidification.

Lithium is preferably added to the iron-aluminum alloy electrochemically. This can be performed as the initial charging step within an assembled cell having sufficient reaction product, e.g., lithium sulfide, to provide lithium in the negative electrode composition. However, in order to control electrode quality, some or all of the lithium can be electrochemically deposited in a separate formation cell. A cell containing lithium metal as one electrode, molten salt electrolyte and a second electrode of the porous iron-aluminum alloy can be spontaneously discharged to deposit lithium into the iron-aluminum substrate. Lithium alloy can also be used to supply lithium for electrodeposition but an imposed electrical potential may be required. Such formation cells can be operated through a number of cycles to obtain uniform distribution of lithium throughout the lithium-aluminum-iron alloy.

Various other methods may also be employed in preparing the lithium-aluminum-iron electrode material. For example, an alloy of aluminum and iron can be directly contacted with molten lithium. A melt of the iron-aluminum-lithium alloy may be prepared and cast, extruded or otherwise fabricated into the desired shape. In addition, a melt of the lithium-aluminum-iron alloy composition can be prepared and a substrate of a porous, electrically conductive metal of high melting point such as stainless steel or nickel can be submerged within the melt, removed and cooled to solidfy the alloy as is taught in Tomczuk et al. cited above.

FIG. 1 illustrates an electrochemical cell that is suitable for testing the electrode composition. In practice, various cell designs may be used incorporating the present electrode composition and the method of its preparation. The electrochemical cell is shown contained within a ceramic crucible 11. The cell includes a negative electrode 13 and a positive electrode 15, both of which are submerged within a molten electrolytic salt 17. Electrode conductors 19 and 21 extend from the positive and negative electrodes respectively.

The positive electrode 15 is illustrated schematically. It includes a suitable positive electrode, active material such as a chalcogen, e.g. sulfur, selenium or tellurium, or a transition metal chalcogenide such as an oxide, sulfide, selenide of the various transition metals such as chromium, manganese, iron, cobalt, nickel, copper or molybdenum. Electrodes including the sulfides of iron, cobalt, nickel and copper are of substantial interest. These active materials can be provided in various forms including molten liquid, particulate matter distributed within an electrically conductive substrate or active material within a carbonaceous compact or plaque. Positive electrodes of these types are well known.

Electrolyte 17 within the crucible can be a molten salt composition, for instance LiCl—Kcl or LiCl—LiF—KBr. Various other suitable electrolytes can be selected from those listed in U.S. Pat. No. 3,488,221. Electrolytes containing lithium ions in an organic or aqueous phase may also be suitable for use with the present negative electrode composition.

Negative electrode 13 can be in the form of a porous compact or plaque prepared by one of the methods described to include the novel lithium-aluminum-iron electrode material. Coiled wires, coated substrates and various other forms of this novel electrode material can also be adapted for use in this application.

The following example is presented merely to illustrate one specific embodiment of the present invention and to demonstrate improvements over a conventional lithium-aluminum electrode.

EXAMPLE

A negative electrode is formed by first preparing an alloy of iron and aluminum in about ¼ atom fraction iron and ¾ atom fraction aluminum. The alloy was prepared by melting the constituents together at about 1200° C., solidifying the melt and comminuting to about −100 +200 U.S. sieve series mesh. These particles were vibrated into a commercially available foamed iron substrate. This loaded substrate was established as an electrode in a cell opposite to a conventional lithium-aluminum electrode and lithium was electrodeposited into the particles of aluminum-iron alloy. The fully charged lithium-aluminum-iron electrode exhibited an open circuit voltage of about 0.25 volts versus the lithium-aluminum electrode. A subsequent examination by X-ray diffraction disclosed the presence of $Al_5Fe_2$.

This negative electrode plaque as thus formed was estimated to have 42 atom percent lithium. It was assembled in an experimental cell similar to that illustrated in FIG. 1 as the negative electrode. The positive electrode contained FeS and $Cu_2S$ as the negative active material within a bonded carbonaceous substrate. The cell resistance was about 50 to 70 mohms at 1 ampere current.

This cell was operated over 30 cycles at about 50 $mA/cm^2$. The discharge characteristics of a typical cycle is compared with that of a conventional lithium-aluminum electrode in FIG. 2. The conventional lithium-aluminum electrode was provided with excess capacity and operated opposite to the same positive electrode as was the electrode of lithium-aluminum-iron. Both electrodes were discharged at about 1 ampere current in accumulating the data shown in FIG. 2.

Figure 2:
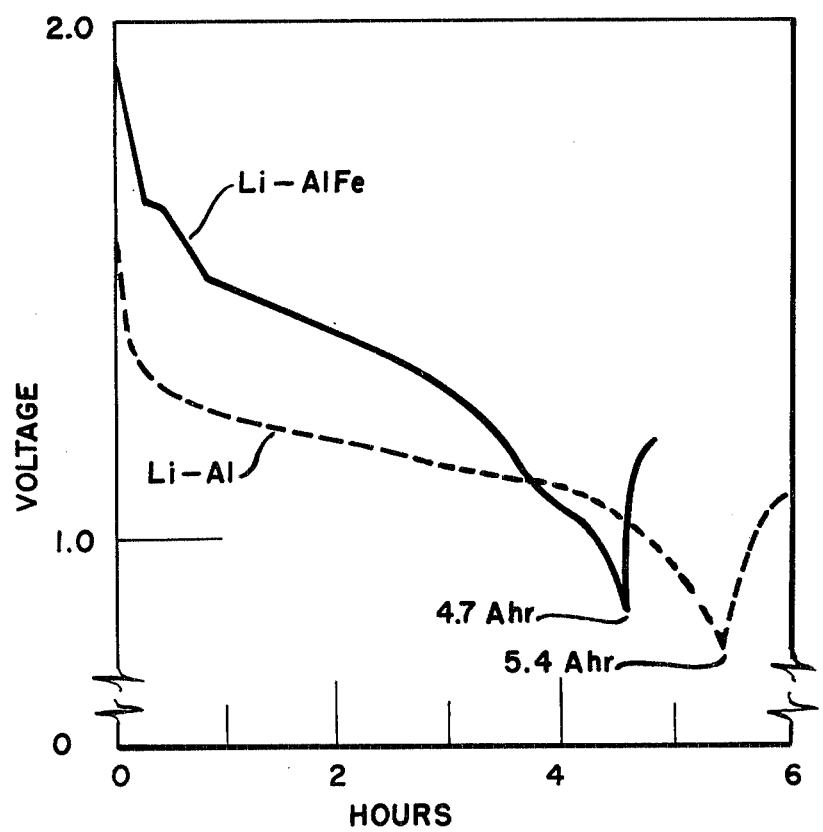
FIG. 2 is a graph of discharge voltage versus time for two electrochemical cells, the first including the negative electrode composition of the present invention and the other a conventional lithium-aluminum negative electrode.

The two curves of FIG. 2 show an approximately 0.2 volt differential favoring the lithium-aluminum-iron electrode throughout most of the half cycle. This advantage in voltage is also expected to provide increased power and energy density over the conventional electrode.

Another expected advantage of the electrode material of the present invention is that of reduced corrosion of iron components within the cell. The inclusion of substantial amounts of iron within the negative electrode should minimize or reduce corrosion resulting from iron-aluminum reactions.

It is to be understood that even in the ordinary lithium-aluminum negative electrodes small amounts, normally less than 5 atom percent, of iron as an impurity may be present. The alloy compositions of the present invention include iron levels added in addition to those impurity amounts which cannot be relied on to effect the advantages attributed to the novel electrode composition of the present invention. It will also be understood that, although the present invention has been described in terms of particular embodiments of electrode structure, variation in materials and processing steps known to those skilled in the art can be made in accordance with the present invention.

The embodiments of the invention in which an exclusive property or privilege is claimed are defined as follows:

1. A solid electrode composition for use in the negative electrode of a secondary electrochemical cell, said cell also including an electrolyte containing lithium ions, and a positive electrode including a chalcogen or a transition metal chalcogenide, said solid electrode composition comprising about 5 to 50 atom percent lithium and 95 to 50 atom percent alloy of aluminum and iron, said aluminum and iron alloy comprising about 20 to 35 atom percent iron.

2. The electrode composition of claim 1 wherein said aluminum-iron alloy includes the intermetallic compound $Fe_2Al_5$.

3. The electrode composition of claim 1 wherein aluminum is included at about 2 to 3 atom parts to each atom part iron.

4. The electrode composition of claim 1 wherein said electrode comprises a major proportion of $Fe_2Al_5$ and minor amounts of $FeAl_2$ or $FeAl_3$.

5. The electrode composition of claim 1 wherein aluminum and iron are present in about 5 to 12 atom proportions respectively.

6. A method of preparing a negative electrode composition for use in a high-temperature, secondary electrochemical cell including an electrolyte containing lithium ions and a positive electrode including chalcogens or transition metal chalcogenides, said method comprising forming an alloy of aluminum-iron having about 20 to 35 atom percent iron and depositing about 5 to 50 atom percent lithium into the aluminum-iron alloy.

7. The method of claim 6 wherein said aluminum-iron alloy is formed into a porous mass prior to depositing lithium therein.

8. The method of claim 6 further comprising forming a melt of aluminum and iron by heating to a temperature above the melting point of aluminum but below the melting point of iron, solidifying the melt to form a solid aluminum-iron alloy, comminuting the alloy to particles, integrating the particles of alloy into a porous, electrically conductive structure and electrochemically depositing lithium into the aluminum-iron alloy.

9. The method of claim 8 wherein the particles of aluminum-iron alloy are compacted with electrolyte to form a porous, electrically conductive mass prior to electrochemically depositing lithium therein.

10. The method of claim 8 wherein the particles of aluminum-iron alloy are distributed into a porous, electrically conductive structure.

* * * * *